United States Patent [19]
Sasaki et al.

[11] Patent Number: 5,218,281
[45] Date of Patent: Jun. 8, 1993

[54] ACCELERATION/DECELERATION CONTROL METHOD FOR A NUMERICAL CONTROL DEVICE

[75] Inventors: Takao Sasaki, Hachioji; Kentaro Fujibayashi, Musashino; Shouichi Sagara, Minamitsuru, all of Japan

[73] Assignee: Fanuc Ltd., Minamitsuru, Japan

[21] Appl. No.: 667,387

[22] PCT Filed: Jul. 20, 1990

[86] PCT No.: PCT/JP90/00937

§ 371 Date: Mar. 25, 1991

§ 102(e) Date: Mar. 25, 1991

[87] PCT Pub. No.: WO91/03009

PCT Pub. Date: Mar. 7, 1991

[30] Foreign Application Priority Data

Aug. 22, 1989 [JP] Japan .................. 1-215284

[51] Int. Cl.[5] ............................................ G05B 19/407
[52] U.S. Cl. ........................... 318/600; 318/573; 318/603; 364/474.3
[58] Field of Search .................. 318/560–646; 364/474.01–474.28, 474.30

[56] References Cited

U.S. PATENT DOCUMENTS

| | | | |
|---|---|---|---|
| 4,469,993 | 9/1984 | Swanson et al. | 318/561 |
| 4,543,625 | 9/1985 | Nozawa et al. | 318/573 X |
| 4,575,666 | 3/1986 | Nakashima et al. | 318/661 |
| 4,629,956 | 12/1986 | Nozawa et al. | 318/625 |
| 4,652,804 | 3/1987 | Kawamura et al. | 318/590 |
| 4,698,777 | 10/1987 | Toyoda et al. | 318/573 X |
| 4,728,872 | 3/1988 | Kishi et al. | 318/603 X |
| 4,912,385 | 3/1990 | Kawamura et al. | 318/603 |
| 4,941,104 | 7/1990 | Teshima et al. | 364/474.3 |
| 4,961,034 | 10/1990 | Kakino et al. | 318/600 |
| 4,992,715 | 2/1991 | Nakamura et al. | 318/649 |
| 4,994,978 | 2/1991 | Kawamura et al. | 364/474.3 |

FOREIGN PATENT DOCUMENTS 0262600 6/1988 European Pat. Off. .
8906066 6/1989 World Int. Prop. O. .

*Primary Examiner*—Paul Ip
*Attorney, Agent, or Firm*—Staas & Halsey

[57] ABSTRACT

An acceleration/deceleration control method for a numerical control device (CNC) which subjects a command value of a velocity in a tangential direction of a traveling path, which is instructed by a pre-interpolation feed command, to an acceleration/deceleration control. A command is read (S1), and an angle $\theta$ of a traveling direction of a tool with respect to an X axis is calculated (S2). Tangential accelerations $\alpha vx$ and $\alpha vy$ are derived based on preset maximum permissible accelerations for individual axes and the angle $\theta$ (S3). A smaller of the tangential accelerations $\alpha vx$ and $\alpha vy$ is set as a tangential acceleration $\alpha v$ (S4). The command velocity F is subjected to the acceleration/deceleration control by using the acceleration $\alpha v$ (S5), and then the interpolation is effected (S6). Since the tangential acceleration $\alpha v$ is set to a maximum value in a range in which the accelerations of the individual axes will not exceed the maximum permissible values thereof, the time required for effecting the acceleration/deceleration control can be reduced to a minimum value.

1 Claim, 3 Drawing Sheets

ACCELERATION/DECELERATION CONTROL METHOD FOR A NUMERICAL CONTROL DEVICE

BACKGROUND OF THE INVENTION

1. Field of the Invention

This invention relates to an acceleration/deceleration control method for a numerical control device (CNC) which subjects a pre-interpolation tangential velocity command value to an acceleration/deceleration control, and more particularly, to an acceleration/deceleration control method for a numerical control device by which an increase in the machining time caused by the acceleration/deceleration control is reduced to a minimum permissible value.

2. Description of the Related Art

In numerical control devices (CNC), an instructed tool feed speed is automatically subjected to an acceleration/deceleration control to achieve a smooth starting operation and stopping operation, and further, to ensure a change of the feed speed when required.

In the conventional acceleration/deceleration control method, a post-interpolation acceleration/deceleration control is effected for post-interpolation feed speeds of individual axes, by using predetermined accelerations, but this method has a drawback in that an actual path may be deviated from the instructed path because of a delay caused by the acceleration/deceleration control when corner portions of a path are continuously machined, to thereby cause an error in the machined shape.

To eliminate the above drawback, a pre-interpolation acceleration/deceleration control method has been developed and put to practical use. In the pre-interpolation acceleration/deceleration control method, a pre-interpolation feed speed, i.e., the feed speed in a tangential direction of the command path, is subjected to the acceleration/deceleration control, and no error occurs in the machined shape due to a delay caused by the acceleration/deceleration control. Since the acceleration during the acceleration/deceleration control must be set in such a manner that it does not exceed the maximum permissible accelerations for the individual axes, it is set to a constant value equal to the permissible acceleration of an axis having a minimum permissible acceleration, taking into account a worst case wherein the direction of the feed command is parallel to the axis having a minimum permissible acceleration, for example.

Nevertheless, where the feed direction is not parallel to the axis, the actual acceleration of the axis becomes smaller than the permissible acceleration, and thus the performance of the machine cannot be fully utilized and the machining time is unnecessarily prolonged.

SUMMARY OF THE INVENTION

This invention has been made in view of the above circumstances, and an object thereof is to provide an acceleration/deceleration control method for a numerical control device by which an increase in the machining time caused by the acceleration/deceleration control is reduced to a minimum permissible value.

To solve the above problem, according to this invention, there is provided an acceleration/deceleration control method for a numerical control device (CNC) which subjects a command value of a velocity in a tangential direction of a traveling path, which is commanded by a pre-interpolation feed instruction, to an acceleration/deceleration control, wherein a maximum permissible acceleration is set for individual axes to be controlled, an optimum acceleration is derived based on the direction of the feed command and the maximum permissible acceleration, and the acceleration/deceleration control is effected in accordance with the acceleration.

The acceleration (tangential acceleration) instructed by the tangential velocity command value is automatically determined in accordance with the feed instruction, and then the acceleration/deceleration control is effected. Since the tangential acceleration is set to a maximum value that does not exceed the maximum permissible value, the time required for the acceleration/deceleration control can be reduced to a minimum value.

DESCRIPTION OF THE PREFERRED EMBODIMENT

An embodiment of this invention will be described with reference to the accompanying drawings.

Figure 2:
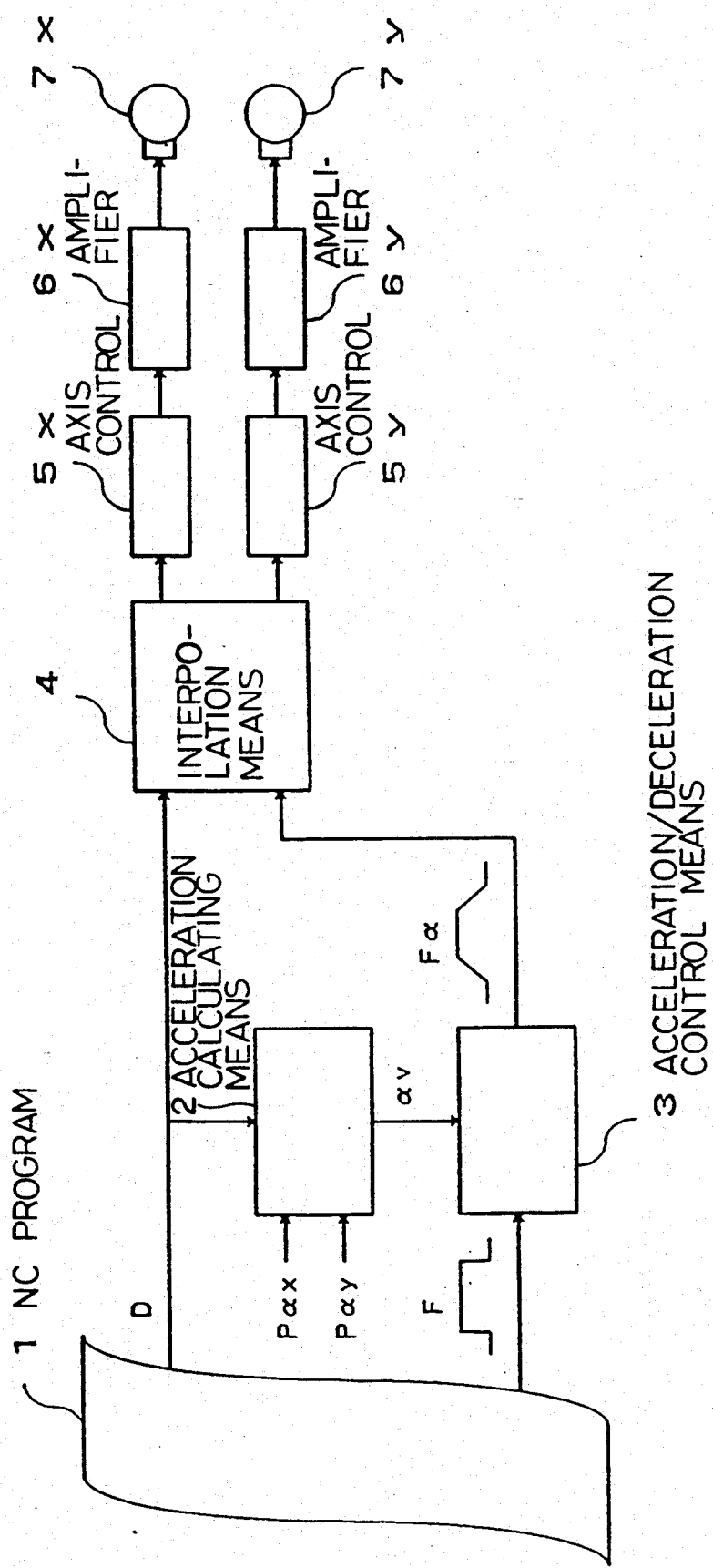
FIG. 2 is a block diagram showing the construction of a numerical control device for carrying out this invention.

FIG. 2 is a block diagram showing the construction of a numerical control device (CNC) for effecting an acceleration/deceleration control method of this invention. In this figure, traveling data D indicating feed directions of individual axes and a tangential velocity command value F are output from an NC program 1, and an acceleration calculating means 2 derives a tangential acceleration $\alpha v$ for each block, based on the traveling data D, a preset maximum permissible acceleration $P\alpha x$ of an X axis, and a maximum permissible acceleration $P\alpha y$ of a Y axis, by a method described later. An acceleration/deceleration control means 3 subjects the tangential velocity command value F to an acceleration/deceleration control by using the tangential acceleration $\alpha v$, and outputs a velocity command value $F\alpha$.

An interpolation means 4 effects a pulse distribution based on the traveling data D and the velocity command value $F\alpha$, which has been subjected to the acceleration/deceleration control, and axis control circuits 5x and 5y are actuated by command pulses from the interpolation means to drive an X-axis servomotor 7x and a Y-axis servomotor 7y through servo-amplifiers 6x and 6y.

Next, a method of calculating the tangential acceleration $\alpha v$ will be explained with reference to FIGS. 3(a) and 3(b). In these figures, the abscissa indicates the acceleration in the X-axis direction and the ordinate indicates the acceleration in the Y-axis direction.

Figure 3A:
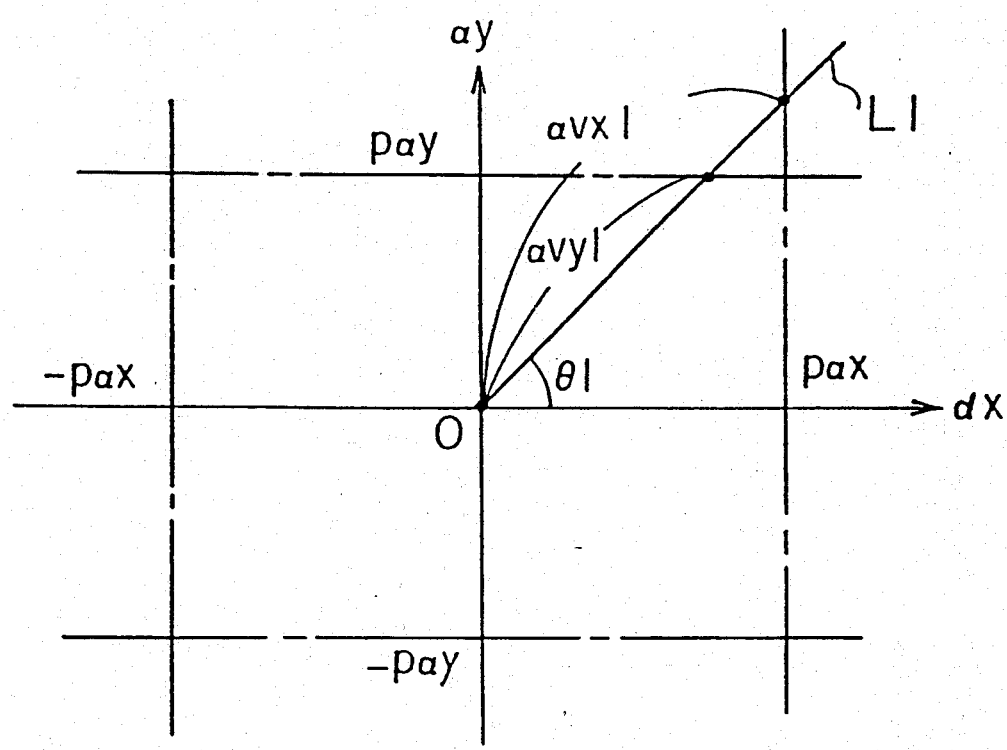
FIGS. 3(a) and 3(b) are diagrams for explaining a method of deriving a tangential acceleration according to this invention.

In FIG. 3(a), $\theta 1$ indicates the angle between the instructed feed direction and the X-axis, and a distance from the origin O to a predetermined point on a straight line L indicates the magnitude of the tangential acceleration. A tangential acceleration $\alpha vx1$ set when a maximum permissible acceleration Pax is given on the X-axis, and a tangential acceleration αvy1 set when a maximum permissible acceleration Pay is given on the Y-axis, can be obtained by the following equations.

$$\alpha vx1 = Pax/\cos\theta1$$

$$\alpha vy1 = Pay/\sin\theta1$$

In the case shown in the figure, αvx1>αvy1, and thus αvy1 is used as the actual tangential acceleration αv1 and the acceleration/deceleration control is effected based on this acceleration.

Figure 3B:
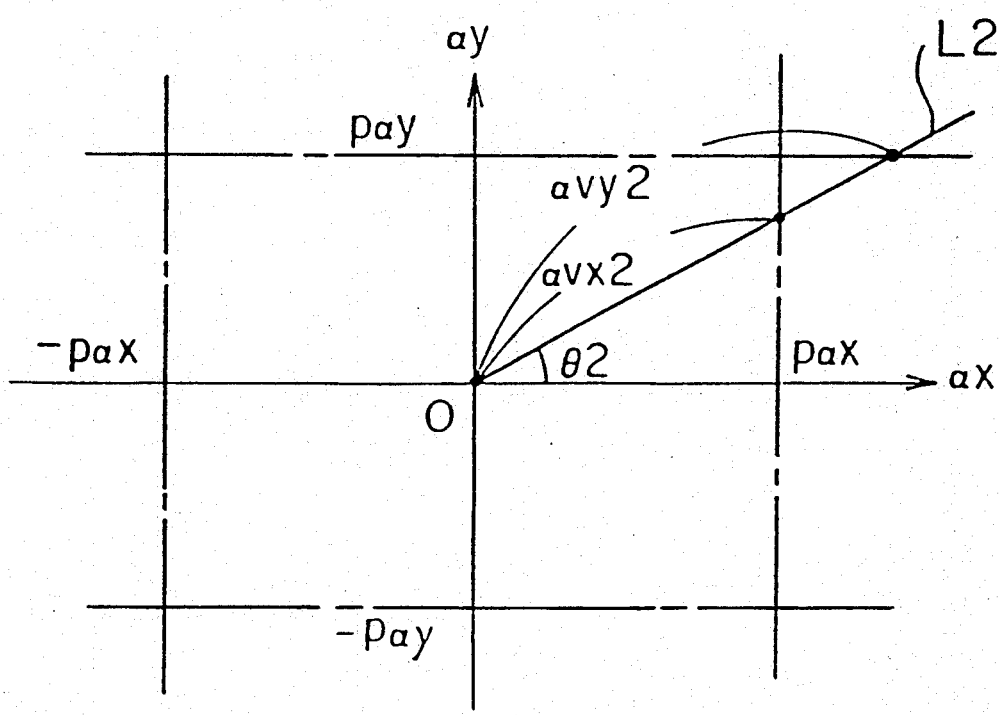

FIG. 3(b) shows an example in which the angle of the feed direction is different from that shown in FIG. 3(a). In this case, since a tangential acceleration αvx2 obtained under a condition that a maximum permissible acceleration is given to the X-axis is smaller than a tangential acceleration αvy2 obtained under a condition that a maximum permissible acceleration is given to the Y-axis, an actual tangential acceleration αv2 is set as follows:

$$\alpha v2 = \alpha vx2 = Pax/\cos\theta2$$

As described above, a smaller one of the two tangential accelerations obtained under a condition that the maximum permissible acceleration can be given to corresponding axes is selected. Namely, the maximum acceleration is set as an actual tangential acceleration in a range such that the accelerations of the respective axes will not exceed the maximum permissible values thereof.

Figure 1:
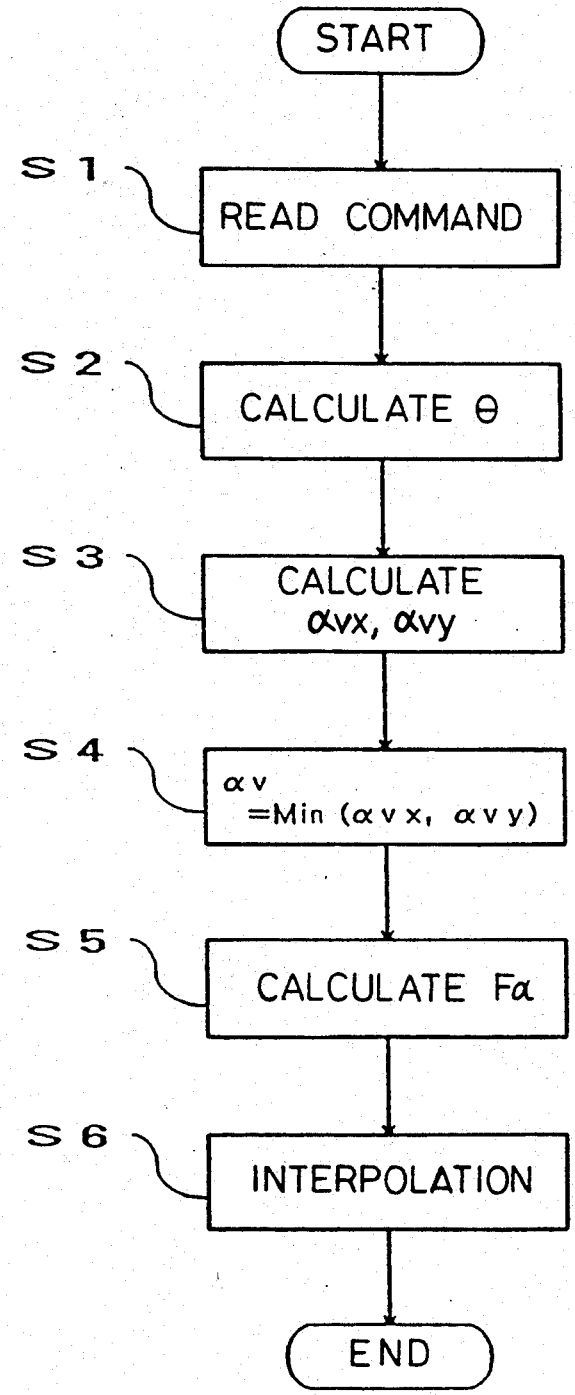
FIG. 1 is a flowchart illustrating an acceleration/deceleration control method according to one embodiment of this invention.

FIG. 1 is a flowchart illustrating an acceleration/deceleration control method according to one embodiment of this invention. In this figure, a number following "S" indicates the step number.

[S1] One block command is read.

[S2] An angle θ of the path is obtained based on coordinate values of the start and end points of the block.

[S3] A tangential acceleration αvx obtained under a condition that a maximum permissible acceleration is given to the X-axis and a tangential acceleration αvy obtained under a condition that a maximum permissible acceleration is given to the Y-axis are derived.

[S4] The smaller of the tangential acceleration αvx and αvy is selected and set as αv.

[S5] A tangential velocity command value Fα is obtained by subjecting the instructed tangential velocity command value F to the acceleration/deceleration control by using the tangential acceleration αv.

[S6] An interpolation is carried out by using the tangential velocity command value Fα, which has been subjected to the acceleration/deceleration control.

In the above embodiment, the acceleration/deceleration control is effected for the two control axes of X-axis and Y-axis, but the number of axes is not limited thereto and the invention can be applied to a numerical control device having any desired number of control axes.

As described above, according to this invention, since the tangential acceleration can be automatically set to a maximum value in accordance with the direction of the feed command, in a range such that the accelerations of the respective axes will not exceed the permissible accelerations thereof, and is then subjected to the acceleration/deceleration control, an increase of the machining time caused by the acceleration/deceleration control can be reduced to a minimum permissible value, to thereby enhance the machining efficiency.

What is claimed is:

1. A method for controlling acceleration/deceleration of a numerical control device controlling movement along a plurality of axes, comprising the steps of:
   (a) inputting data designating a direction of movement;
   (b) calculating a maximum permissible acceleration/deceleration along each axis required for the direction of movement designated in step (a);
   (c) determining which maximum permissible acceleration/deceleration calculated in step (b) is smallest and therefore a limiting maximum;
   (d) generating a tangential velocity command value in dependence upon the limiting maximum determined in step (c) and the direction of movement designated in step (a); and
   (e) controlling movement of the numerical control device in dependence upon the tangential velocity command value generated in step (d).

* * * * *